United States Patent
Flanagan et al.

(10) Patent No.: US 6,292,769 B1
(45) Date of Patent: *Sep. 18, 2001

(54) SYSTEM FOR AUTOMATED TRANSLATION OF SPEECH

(75) Inventors: Mary A. Flanagan, Hilliard; Philip Jensen, Columbus, both of OH (US); Douglas P. Chinnock, Tucson, AZ (US)

(73) Assignee: America Online, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,325

(22) Filed: May 19, 2000

Related U.S. Application Data

(63) Continuation of application No. 08/959,688, filed on Oct. 29, 1997, which is a continuation-in-part of application No. 08/745,222, filed on Nov. 8, 1996, now Pat. No. 5,966,685, which is a continuation of application No. 08/388,630, filed on Feb. 14, 1995, now abandoned.

(51) Int. Cl.[7] .................................................. G06F 17/28
(52) U.S. Cl. ................................................ 704/3; 704/277
(58) Field of Search ............................... 704/2, 3–8, 277; 707/536; 379/88.05, 88.06

(56) References Cited

U.S. PATENT DOCUMENTS

| | | | |
|---|---|---|---|
| 4,615,002 | 9/1986 | Innes | 704/8 |
| 5,029,085 | 7/1991 | Ito | 704/9 |
| 5,268,839 | * 12/1993 | Kaji | 704/2 |
| 5,295,068 | * 3/1994 | Nishino et al. | 704/2 |
| 5,497,319 | * 3/1996 | Chong et al. | 704/2 |
| 5,541,837 | * 7/1996 | Fushimoto | 704/2 |
| 5,675,817 | 10/1997 | Moughanni et al. | 704/3 |
| 5,715,466 | * 2/1998 | Flanagan et al. | 704/2 |
| 5,740,231 | * 4/1998 | Cohn et al. | 379/89 |
| 5,765,131 | * 6/1998 | Stentiford et al. | 704/277 |
| 5,828,990 | 10/1998 | Nishino et al. | 704/2 |

OTHER PUBLICATIONS

Dragon Dictate For Windows 2.5—Dragon Dictate for Windows 2.5 Brochure (visited Oct. 7, 1997) <http://www.dragonsys.com>.*

Joe Salemi, *Tools for Wide Area Communications*, PC Magazine (vol. 10, n. 15), Sep. 10, 1991, at 231.

Dennis Fowler, *Treading the boards; Call Foreign Boards of Use Echomail to Extend Your Research Further Than Your Wallet*, Computer Shopper (vol. 13, n. 1), Jan., 1993, at 766.

George A. Alexander et al., *Machine Assisted Translation*, The Seybold Report (vol. 22, n. 4), Oct. 30, 1992, at 14.

*Multilanguage Software is Everywhere*, The Seybold Report on Desktop Publishing (vol. 5, n. 5), Jan. 1, 1991, at 24.

(List continued on next page.)

*Primary Examiner*—Patrick N. Edouard
(74) *Attorney, Agent, or Firm*—Standley & Gilcrest LLP

(57) ABSTRACT

The present invention allows subscribers to an online information service to participate in real-time conferencing or chat sessions in which a message originating from a subscriber in accordance with a first language is translated to one or more languages before it is broadcast to the other conference areas. Messages in a first language are translated automatically to one or more other languages through languages translation capabilities resident at online information service host computers. Access software that subscribers use for participating in conference is integrated with speech recognition and speech generation software such that a subscriber may speak the message he or she would like to share with other participants and may hear the messages from the other participants in the conference. Speech-to-speech translation may be accomplished as a message spoken into a computer microphone in accordance with a first language may be recited by a remote computer in accordance with a second language.

17 Claims, 11 Drawing Sheets

OTHER PUBLICATIONS

Janus, Carnegie Mellon University's speech–to–speech translation system—*Recent Advances in Janus: A Speech Translation System* (visited Oct. 7, 1997) <http://werner-.ira.uka.de/~monika/p...tml/euro93.janus/euro93.janus.html>.

SYSTRAN PROfessional for Windows—*SYSTRAN Speaks Your Language To The World* (visited Oct. 7, 1997) <http://www.systransoft.com/profile.html>.

*Computer–Assisted Translation* (Oct. 7, 1997) <http://www.who.int/pll/cat/index.html>.

\* cited by examiner

SYSTEM FOR AUTOMATED TRANSLATION OF SPEECH

This application is a continuation of the application Ser. No. 08/959,688, filed Oct. 29, 1997, which was a continuation-in-part of the application Ser. No. 08/745,222, filed Nov. 8, 1996, which is now U.S. Pat. No. 5,966,685, which was a file-wrapper continuation of the application 08/388,630, filed Feb. 14, 1995, which is now abandoned.

BACKGROUND OF THE INVENTION

1. Field of the Invention

The present invention relates geneally to a system for automated translation of speech in a real-time conferencing or chat environment. Particularly, the present invention integrates speech recognition, machine translation, and speech generation technology into a system for accepting messages from and broadcasting messages to subscribers of an online information system such that a massager spoken by a subscriber in a first language may be heard by subscribers in a second language.

2. Description of Related Art

Subscribers to online information services today may communicate with other subscribers in accordance with asynchronous communication methods such as electronic mail. Communications between subscribers to an online information service may also occur in real time as subscribers initiate and join ongoing conference room or "chat" sessions managed by the information service. Online information services and other computer networks that support real-time conferencing or chat are increasingly being accessed by users who speak a variety of Languages. Consequently, online discussions between subscribers who have similar interests and who understand the same language are proliferating. Although subscribes throughout the world may have similar interests, a subscriber may be prevented from participating in a particular conferencing or chat session because he does not understand the language in which the discussion is being conducted. For example, a person is interested in international law and who understands only French may be prevented, due to a language barrier, from participating in English or German discussions regarding international law. Typically, communications from subscribers are submitted to a conferencing or chat session in accordance with type-written messages that are then transmitted as entered through the computer network supporting the session. Thus, the need arises for translation of real-time chat or conferencing messages into foreign languages so that subscribers who do not necessarily understand the same languages, but have similar interests can participate in a single real-time discussion or chat.

Real-time conferencing or chat discussions are intended to simulate conversations between subscribers. Although the participants may be in different locations throughout the world, messages are displayed to all participants such that each participant "hears" what the other participants are saying just as they would if having a discussion within one room. Communications between participants actually occur in accordance with messages that are typed by a participant, transmitted to the computer network on which the discussion is taking place, and displayed to the other participants so they may read them. A first subscriber participating in a chat session types a message that is then broadcast to the other subscribers participating in the session. A subscriber who wishes to respond to the initial message then types a response which is in turn broadcast to the remaining participants. As current real-time conferencing an chat and systems rely on written or textual data for communications between subscribers, the ability to communicate effectively in such sessions may be encumbered by a person's ability to read and/or type quickly. Persons with disabilities such as blindness or dexterity loss often cannot participate in online conference or chat sessions. Thus, the need arises for a real-time conferencing or chat system that allows subscribers to speak the messages they would like to share with other subscribers and to hear the messages that have entered or submitted by other subscribers.

SUMMARY OF THE INVENTION

The present invention addresses problems in current online chat or conferencing sessions that result from reliance on written or textual data that are transmitted through the computer network as entered by the subscribers. The present invention integrates speech generation and speech recognition technology as well as machine translation technology in an online chat or conferencing systems so that subscribers may speak rather than type their messages and hear comments from subscribers who may have entered their messages, possibly in a different language. Speech recognition and speech generation software is integrated with the access software that subscribers use to communicate with the online information service or computer network that facilitates the chat or conferencing session. The speech recognition software accepts as input a subscriber's spoken words. The speech data is translated to textual data and submitted to the online information service or computer network for processing. Machine translation software (i.e., language translation software) that is resident at the online information service or computer network may translate the textual data into one or more foreign languages depending on various language preferences specified by the participants. The untranslated text as well as the translated text is broadcast to the subscribers participating in the session in accordance with their language preferences. The speech generation software at the subscriber's computer accepts the textual data, which may have been translated from another languages, as input and recites or reads the text to the subscriber. Speech-to-speech chat or conferencing is achieved in accordance with machine translation of communications such that subscribers can speak and hear in their native languages messages which may have been translated from other languages. Consequently, subcribers are no longer required to type and read messages when participating in real-time chat or conferencing sessions. Furthermore, they may participate in chat or conferencing sessions with subscribers who speak different languages. The advantages of the present invention will be apparent from the following detailed description of the invention, drawings, and claims.

DETAIL DESCRIPTION OF PREFERRED EMBODIMENT(S)

Figure 1:
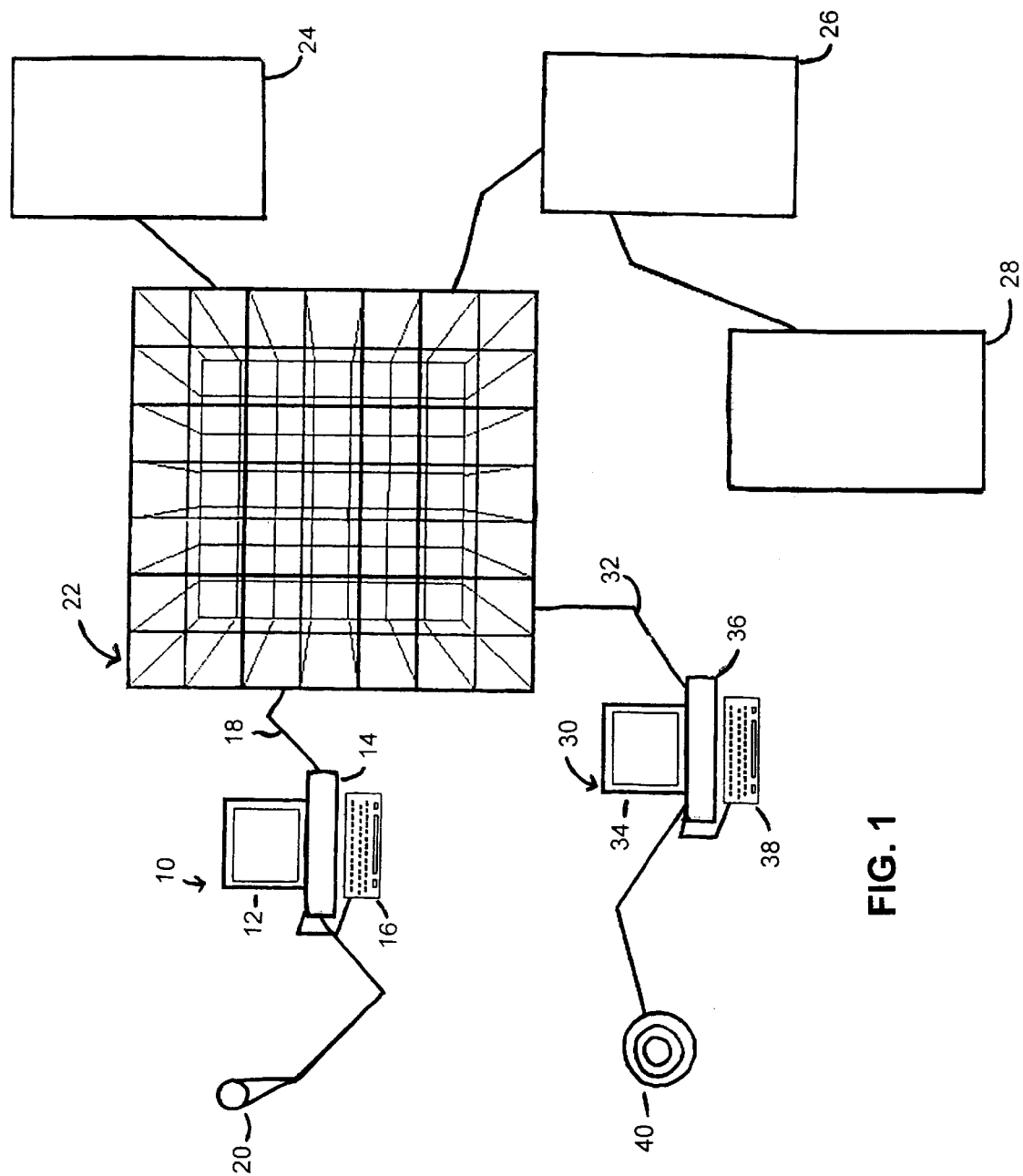
FIG. 1 is a system organization diagram of the primary components of a preferred embodiment of the present invention.
Figure 2:
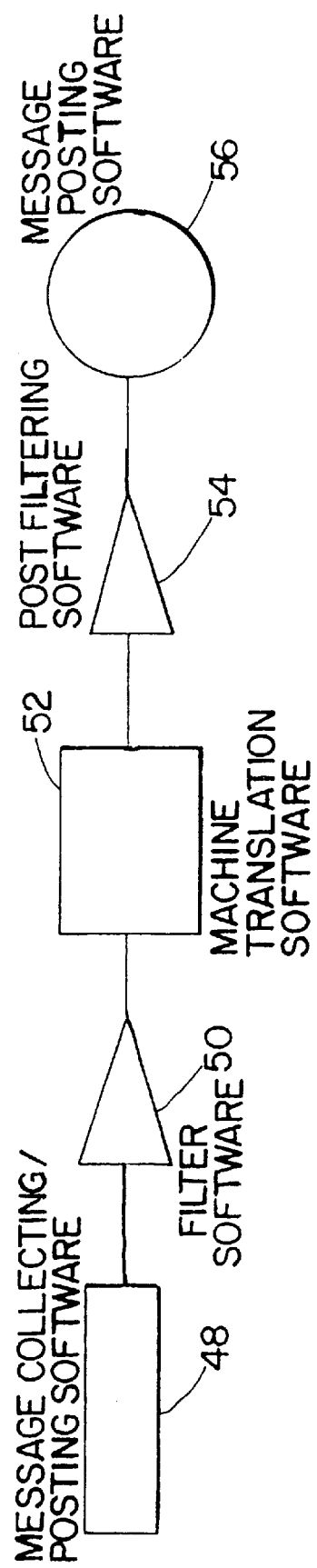
FIG. 2 is a block diagram of a machine translation process in a preferred embodiment of the present invention.

Referring to FIG. 1, the primary components of the present invention are shown. Subscribers interact with the present invention through a personal computer or workstation 10, 30 that is, preferably, equipped with a monitor 12, 34 for viewing results of interactions, a computer 14, 36 equipped with a plurality of devices including a modem for establishing a connection 18, 32 with an online information service or computer network, and a keyboard 16, 38 for interacting with the computer 14, 36. The modem may be used to establish a modem connection 18, 32 to one or more host computers that comprise a wide area network 22 of an online information or other type of service. Other means such as a cable connection may be used to establish a connection to the online information service. Each personal computer 10, preferably, is equipped with a microphone 20 for interacting with speech recognition software. Finally, each personal computer 30, preferably, is equipped with speakers and a sound card or other type of built-in audio system 40 to support speech generation software.

In addition to the various hardware components or devices, the personal computer may be equipped with on or more application software programs that manage a subsciber's interactions with the personal computer 10, 30 and that manage communications between the personal computer 10, 30 and one or more host computers that are part of an online information service wide area network 22. For example, the personal computer 10, 30 may be equipped with general purpose access software that is available from the online information service. This online information service general purpose access software may be referred to as the Information Manager or IM. The IM may facilitate establishing a modem connection 18, 32 between the personal computer 10, 30 and the wide area network 22 host computers of the online information service. The IM may operate in accordance with one or more protocols (e.g., a proprietary protocol, TCP/IP, etc.) that facilitate data transfers and other communications with the online information service wide are 22. Presentation of information to the subscriber may also be managed by the IM. Preferably, the IM operates in a multitasking, graphical interface environment such as the Microsoft® Windows™ operating system such that user interactions are managed in accordance with one or more windows appearing on the subscriber's personal computer monitor 12, 34 or display screen.

The subscriber's personal computer may also be equipped with speech recognition and speech generation software such as DragonDictate® for Windows® 2.5 or Dragon NaturallySpeaking™, both from Dragon Systems, Inc. The speech recognition capabilities of the software include speech-to-text translation services. Speech entered by a user via a microphone is translated to text (e.g., ASCII) which is understood by of compatible with most of the application software (e.g., word processor, online information service access software, etc.) that may be executed on the personal computer. Preferably, the speech recognition software is implemented in such a way that speech entered via a microphone is translated to text and redirected to the active window on the personal computer. Translation of speech-to-text is thus performed in a manner that is transparent to the other software applications and the other software applications accept the translated text as though it had been typed by the user or otherwise submitted, for example, through as ASCII file. The speech generation capabilities of the software include text-to-speech translation services. Textual output from a software application (e.g., word processor, online information service access software) may serve as input to a speech generation module such that the text is read to a user. Changes to a software application may be required such that output from the application is redirected (or copied) to the speech generation software. The speech generation software then causes the speaker or audio system in the personal computer to speak or recite the text and thus, allows the user to hear the words of the text. The text may also be displayed simultaneously in an output window appearing on the personal computer monitor or screen display such that the user sees the words displayed as they are spoken by the computer.

As show in FIG. 1, subscribers who use the present invention interact via an online information service such as CompuServe Incorporated's CompuServe Information Service that may be described as a wide area network 22 consisting of node computers that manage network traffic and host computers with which subscribers communicate in order to take advantage of the services offered. An online information service network node may be responsible for routing communications between the personal computers of participants 10, 30 and a conference manager 24 that manages a real-time conferencing or chat session between the participants. The conference manager 24 is preferably, a host computer running one or more application programs that coordinate communications between the participants and other computers (e.g., computers that perform translation services 26, 28.)

Preferably, communications between the conference manager 24 and participants' personal computers 10, 30 are accomplished using an application-level protocol. The present invention is described in accordance with an application protocol for real time communications that may be referred to as RTC. Using RTC, the conference manager 24 participants' personal computers 10, 30 exchange information in a way that allows the participant' computers to present information in their own interface (e.g., IM.) Information is exchanged in accordance with one or more messages that may include routing instructions and other information to be used by a computer as well as the content of communications submitted by participants.

The RTC software provides remote users—for example, real-time conference or chat participants—with a means to send each other communications without the delays inherent in other online communications services such as bulletin boards and electronic mail. Although bulletin board messages and electronic mail communications are usually delivered to recipients shortly after their originators send them, there may be some acceptable delays in the delivery because the intended recipients are not necessarily awaiting the communications. There is no expectation of an immediate response on the part of the recipient, therefore delivery may be delayed. In real-time communication systems such as real-time conferencing or chat, however, participants rely on immediate delivery of communications so they can get the other participants' reactions as soon as possible. Remote users participating in an online electron conversation may share through their communications comments, questions, observations, etc. Messages passing through the wide area network 22 contain textual data representing the communications submitted by the participants. The contents of messages are displayed to the participants almost immediately after they are sent so that the atmosphere or environment is more like an actual conversation. The RTC application protocol and associated software may support text-based messaging such that textual data that originates from typed text or from speech may be processed.

RTC messages generally relate to requests to participate in a real-time conference or chat, acknowledgements of requests to participate, etc. Messages may also contain data specific to the a particular type of conferencing application and information or instructions about how the data is to be used by the application. Messages are assembled into Protocol Data Units (PDUs) that are exchanged between an application-specific conference manager 24 and the personal computers 10, 30 of conference or chat participants. A PDU contains data packaged in a succinct and structured format so that the amount of data transmitted through the network is reduced. The sending application assembles the data into a PDU while the receiving application disassembles or decodes the PDU. A PDU assemble by one participant's computer contains information about the ongoing conversation such as who is sending the communication, what data and type are associated with the communication, the conference area to which the participant is connected, and information about the sending personal computer. PDUs are transmitted through the networks nodes within in the wide are network 22 that determine where to route the messages containing the communications from the Participants. The receiving application (e.g., on a host computer or participant's personal computer) then decodes the PDU and if necessary, responds with its own PDU.

At any time, more than one conference or chat session may be active at the online information service. For example, one conference may be between participants discussing new features in a database program while another conference may be between participants discussing gardening. RTC distinguishes between any current conference sessions so that PDUs are routed to the proper recipients or participants. PDUs may be distinguished by an identifier for the type of data so that the receiving application (e.g., on a host compute or participant's personal computer) may decode the message. Participants in a real-time conference are assigned a User Reference Number (URN) that provides a unique identifier for the participant while in the conference. During a conference, messages are routed to participants according to URNs. URNs are also used to report arrivals and departures to the conference participants.

Participants 10, 30 in a conference or chat may enter comments, questions, observations, etc. on their computer keyboards 16, 38 or speak comments 20 that are converted to textual data. As textual data is being typed or converted from speech, it is displayed by the IM in an appropriate portion of the display 12, 34. When the New Line key is pressed to finalize each entry, the individual personal computers 10, 30 assemble the textual data into PDUs after attaching identifiers to it. Other information or instructions may be included in the PDUs. For example, there may be a parameter to indicate that the communication is to be sent to all other conference participants rather than to a single recipient. The personal computers then send the PDUs over their respective communications lines 18, 32 to the wide area network 22, and then to the conference manager 24. In the present embodiment, the conference manager 24 is unaware of the existence of multiple languages. Instead, each language is associated with its own independent conference area or chat room. (Accordingly, all subscribers in each conference are communicate in their own language.) the translate polling server 26 operates as an additional subscriber in each conference area. It monitors each conference area or chat room for untranslated communications and forwards the communications to the translate engine 28 where the text of the communication is translated and returned to the translate polling server 26. The translate polling server then directs the translated communication to the appropriate conference area (i.e., conference area of the target language of the translation.) The translated communication is then transmitted to the participants. Each of the personal computers displays this conference communication in the appropriate part of its monitor or display 12, 34. A computer may also recite the conference communication via a speech generation process cooperating with the IM. The textual data from the PDU may be redirected to the speech generation process so the participant may hear the communication.

Although RTC processes messages, the source of the textual data for the messages may be communications as typed by participants via the keyboards 16, 38 at their personal computers or communications as spoken to their personal computers via microphones 20 at their personal computers. Communications that are spoken may be converted from Speech-to-text by the speech recognition software residing at the personal computer. Once converted, the resulting text may be processed through the entire system as though it had actually been typed by the participant. In addition, although the conference communications arriving in PDUs at a participant's personal computer are text-based, they may be converted from text-to-speech by the speech generation software residing at the personal computer. Speech-to-speech conferencing or chat may thus be accomplished using the present invention as participants who wish to share a communication such as a question, comment, or observation may speak their communications to their personal computers while participants who wish to follow the conversation may hear the communications of the other participants as recited to them by their personal computers.

As shown in FIG. 1, language translation of conference communications may be accomplished in accordance with a translation polling server 26 and translation engine 28. The conference manager 24 operates in accordance with the translation polling server 26 and translation engine 28 to facilitate the translation of communications from one language to one or more other languages. The translate polling server monitors activity at or polls the conference manager 24 to determine whether there are any communications to be translated. Communications to be translated to one or more languages are then submitted to the translation engine 28 for translating. In a preferred embodiment of the present invention, translation services are provided by one or more dedicated servers executing application software that has been designed to provide translations of many types of electronic communications. Communications from other contexts such as electronic conference areas (bulletin boards) or electronic mail may be translated using the same services. The type of communication (e.g., conference communication, conference area communication, electronic mail communication) may be indicated in the messages transmitted to the translation engine 28. The type indicates the context in which the communication occurred and may aid the translation engine in providing a context-sensitive translation. For example, abbreviations are used commonly in real-time conferences or chat. Abbreviations commonly used include "RTFM" for "Read the Friendly Manual," "LOL" for "Laughing Out Loud," and "IMHO" for "In My Humble Opinion." If the context for the communication is a real-time conference, the translation engine may be programmed or implemented to account for commonly used abbreviations so the translated communication include appropriately translated abbreviations.

In order to accomplish a single real-time conference or chat session in which subscribers may participate in accordance with preferred language, parallel electronic conference or chat areas are operated in conjunction with a message collection/posting software program, data filter software program, and a machine translation software program. The present invention comprises a number of electronic conference areas operating in parallel. One conference area is operated for each supported language. Each conference area contains the same communications or information in the same order. The difference the parallel conference areas is that each is conducted in accordance with a different language.

Figure 3:
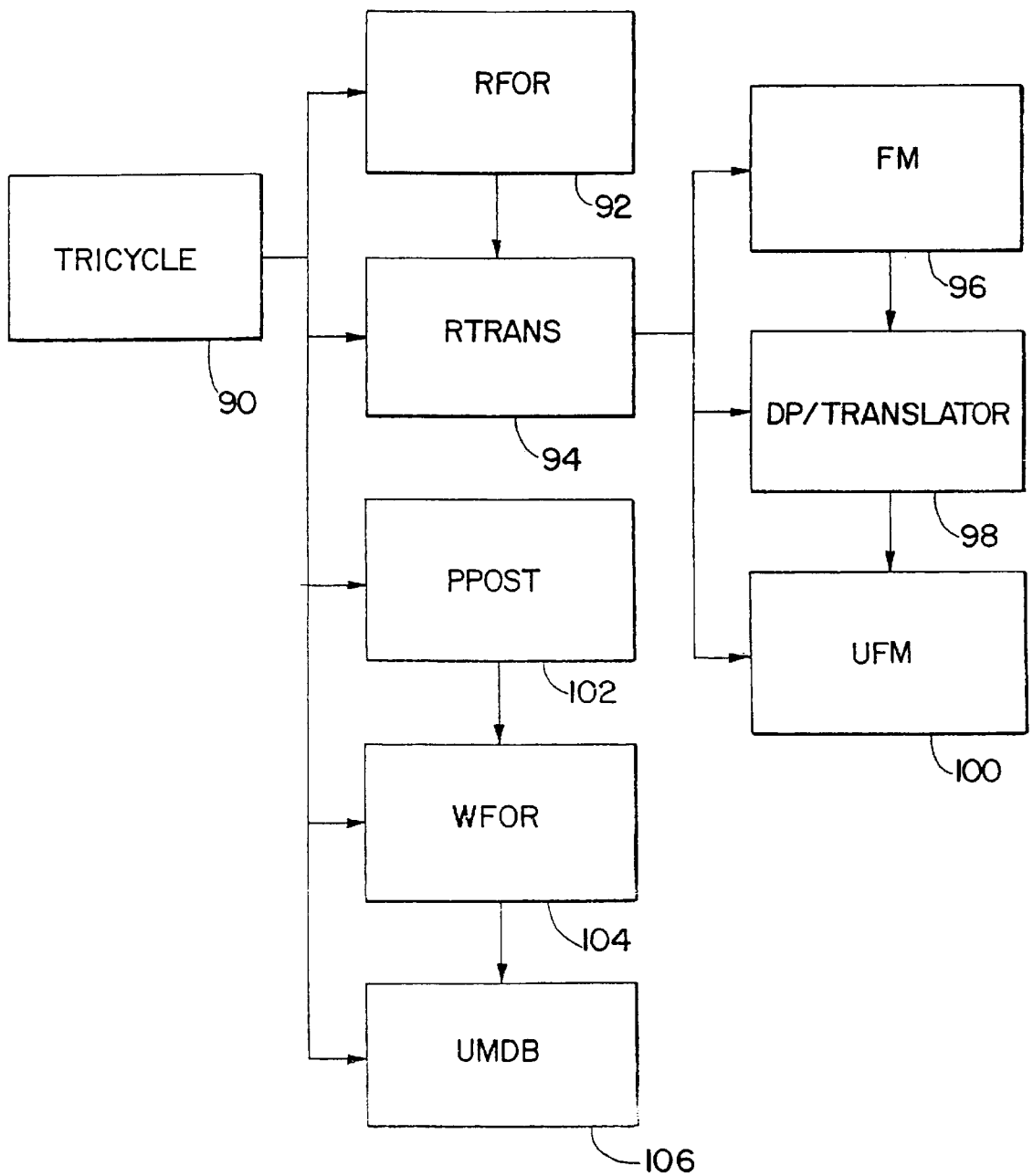
FIG. 3 is a flow chart of a machine translation process in a preferred embodiment of the present invention.

In the present invention, one a subscriber initiates a request to join a particular conference or chat area, he or she may then be prompted to choose his or her language preference. If the subscriber's language preference French, a French version of the conference area will be accessed. Alternatively, a subscriber may indicate a language preference prior to initiating a request to join a particular conference or chat area. The appropriate conference area conducted in accordance with the subscriber's language may be selected automatically for the subscriber. Massages containing subscriber communications which are posted to a conference area are collected frequently, translated to the other languages, and then posted to those respective target language conference areas. The collection and posting of the messages containing the communications is accomplished by the Message Collection/Posting Software which is shown in FIG. 3. The Message Collection/Posting Software may operate on any of the computers comprising the wide area network of the online information service. The new messages that are collected on a frequent basis are sent to a commercially available Machine Translation (MT) software for translation. Once the translation process is complete, the translations are collected and posted, by the Message Collection/Posting Software, to the target language conference areas at the same location within the ongoing conversation as the original version of the message.

Thus, some of the communications on a French version of a conference area will have been submitted originally in French whereas many other communications will be translations of communications that were submitted originally in a different language. Each of the communications translated from another language version of the parallel conference area may contain both the translated communication and the original language communication. For example, a communication originally written in the English version of the conference area and translated to the French version may be shown on a display screen with the original English communication in addition to the French translation.

Referring to FIG. 3, the overall process steps involved in translating and posting a message containing a communication from its source language to the target language of the other conference areas is shown. Every message posted to a conference area is preferably assigned a message identification number by the conference area software. In the preferred embodiment of the present invention, the Message Collection/Posting Software 48 identifies new messages posted to a conference area by comparing the message identification numbers to a continuously created database of old message identification numbers. New messages are collected on a frequent basis submitted to the Filter Software 50 for prepocessing of the message text before submitting it to the MT Software 52.

In a preferred embodiment of the present invention, before the text of a message is submitted to the MT Software 52, it is passed through Filter 50 that preprocesses the textual data before submitting it to the MT Software 52. The filter identifies and marks strings that are best let untranslated by the MT Software 52 such as personal names, company product names, cities and states, commands, and the like. By marking these strings, the Filter Software 50 notifies the MT Software 52 to leave those strings untranslated. These strings are then liked to or concatenated with a preceding "hookword" Hookwords, preferably, are very short text or character strings that are unlikely to have a meaning in the source or target language. For example, "xa" "xn" may be used as hookwords for an English language. Hookwords are automatically inserted. Hoodwords also are contained in dictionaries with a part-of-speech and other grammatical features to effect rearrangement of the word in the target language. A message is translated in accordance with the hookwords contained in the message. Following translation of a message, hookwords are deleted by Post Filtering Software 54. Once translated, the message is delivered to the target conference area and posted by Message Posting Software 56 in the language of that conference area.

In a preferred embodiment, direct translation of the message text is performed (e.g. direct French-to-English translation). The MT Software 52 analyzes and tags the sentences of the message text using linguistic algorithms. The words in the sentences are then located in electronic dictionaries to identify their translations. The translated words are then reordered and inflected according to the rules of the target language. Machine translation software has been developed by a number of software vendors including the Intergraph® Corporation and is commercially available. DP/Translator is the Intergraph® Corporation's natural language translation system used to perform the MT language translation in their embodiment of the invention. Filtering refers to the process by which messages are prepared for translation by DP/Translator The following example illustrates the processes and functions for one embodiment of the present invention.

EXAMPLE

Preferably, message translation is a batch process that runs on a frequent basis. It is driven by a Unix Shell script tricycle, which calls all the necessary programs in the order they need to run. A language code is a one-letter code that refers to a language. For example, French is referred to as $f$. In the following detailed process descriptions, this code is abbreviated as lang-code. A language pair is a two-letter code that refers to the two languages from and to which translation occurs. The first letter is the source language; the second is the target language. For example, in an English-to-German translation, the language pair is eg. In the detailed process descriptions, this is abbreviated as lang-pair. Post-filtering refers to the process by which messages are further prepared for the pre-posting once they have been translated. A shell script is a Unix-based file that contains a list of Unix commands.

A Unix shell script tricycle runs at a predetermined interval to retrieve new messages with communications that subscribers post onto the conference areas. It passes them through the translation process and posts them all three parallel conference areas. A MT Message Read Process reads the messages from the conference areas. A body text file is created as input to a filtering process. The message passes through the translation process. English is translated to French and German. German or French is translated to English.

The message is filtered again to remove the markers added during the MT Filter process for text that was not intended for translation. The translated message is further prepared for posting to the other two conference areas. A posting output file is created that contains translated message with the communicate and additional information required for posting the message with the communication to the conference area.

MT Message Number Database Update adds a line of three message numbers (in this Example) to a database to maintain a cross reference of message identifiers among the three conference areas. These include the message number that the source conference area assigns to the message and the corresponding message numbers for the other two destination or target conference areas.

The following introduces the software components of the MT process. The diagram in FIG. 12 shows the flow in which these components run.

| | Name | Type | Description |
|---|---|---|---|
| 90 | tricycle | Unix shell script | Orchestrates the cycle of the MT process by calling each program in their appropriate order |
| 92 | rfor | C program | Reads communications from conference areas, determines whether they need to be translated, and creates a message header file and a message body text file; called by tricycle |
| 94 | rtrans | Unix shell script | Calls fm to filter the message file, DP/Translator to translate the messages, and ufm to perform post-translation filtering; called by tricycle |
| 96 | fm | C program | Identifies text that is not to be translated and surrounds with markers; called by rtrans |
| 98 | DP/Translator | Intergraph product | Performs message translation; called by rtrans |
| 100 | ufm | C program | Removes markers that surround text identified by fm as nontranslatable; called by rtrans |
| 110 | ppost | C program | Creates a new file containing translated message to post to conference areas; called by tricycle |
| 112 | wfor | C program | Posts messages to their corresponding conference areas; called by tricycle |
| 114 | umdb | C program | Updates a message number database; called by tricycle |

Figure 4A:
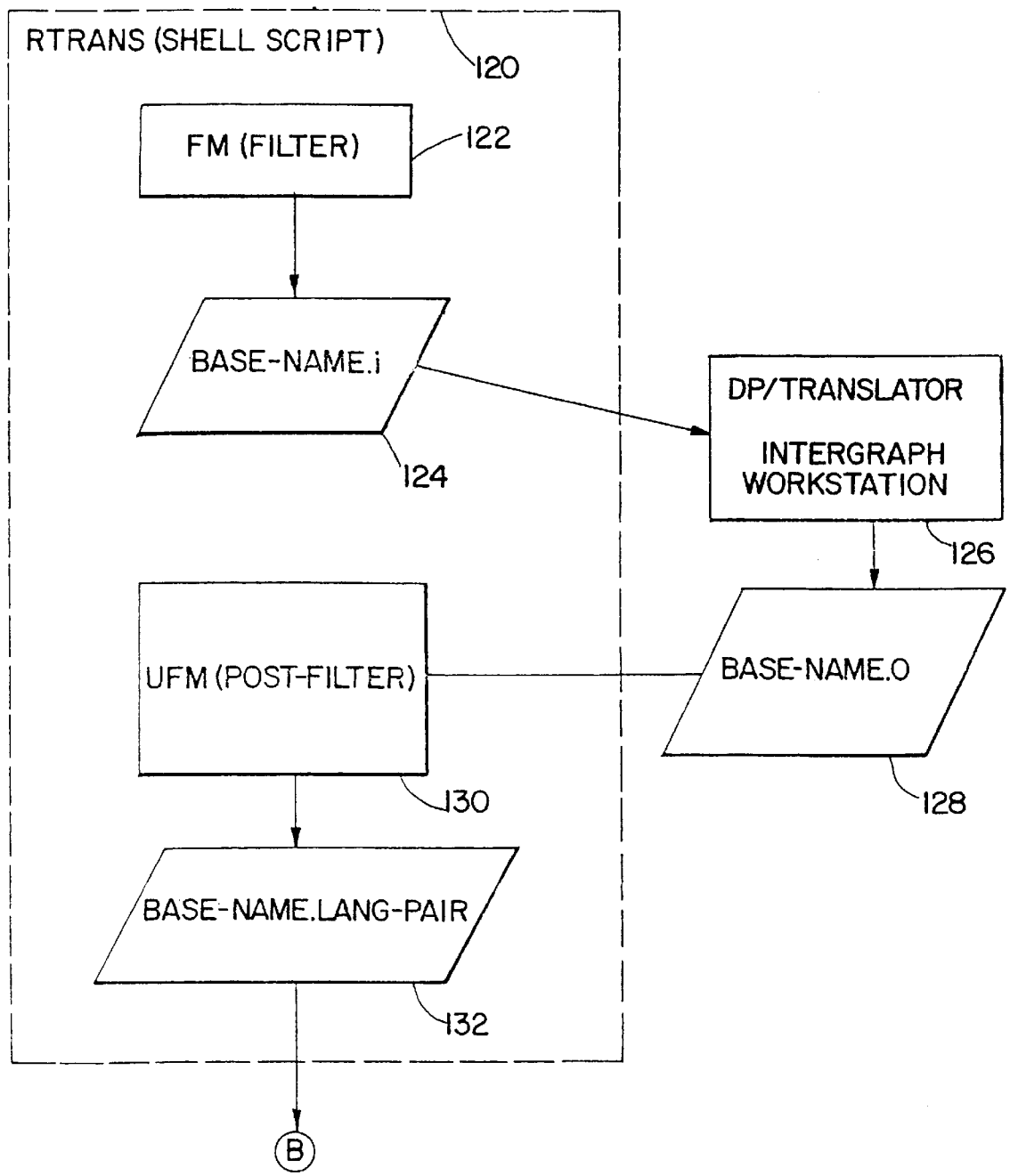
FIG. 4A–B is a detailed flow chart of a machine translation process in a preferred embodiment of the present invention.
Figure 4B:
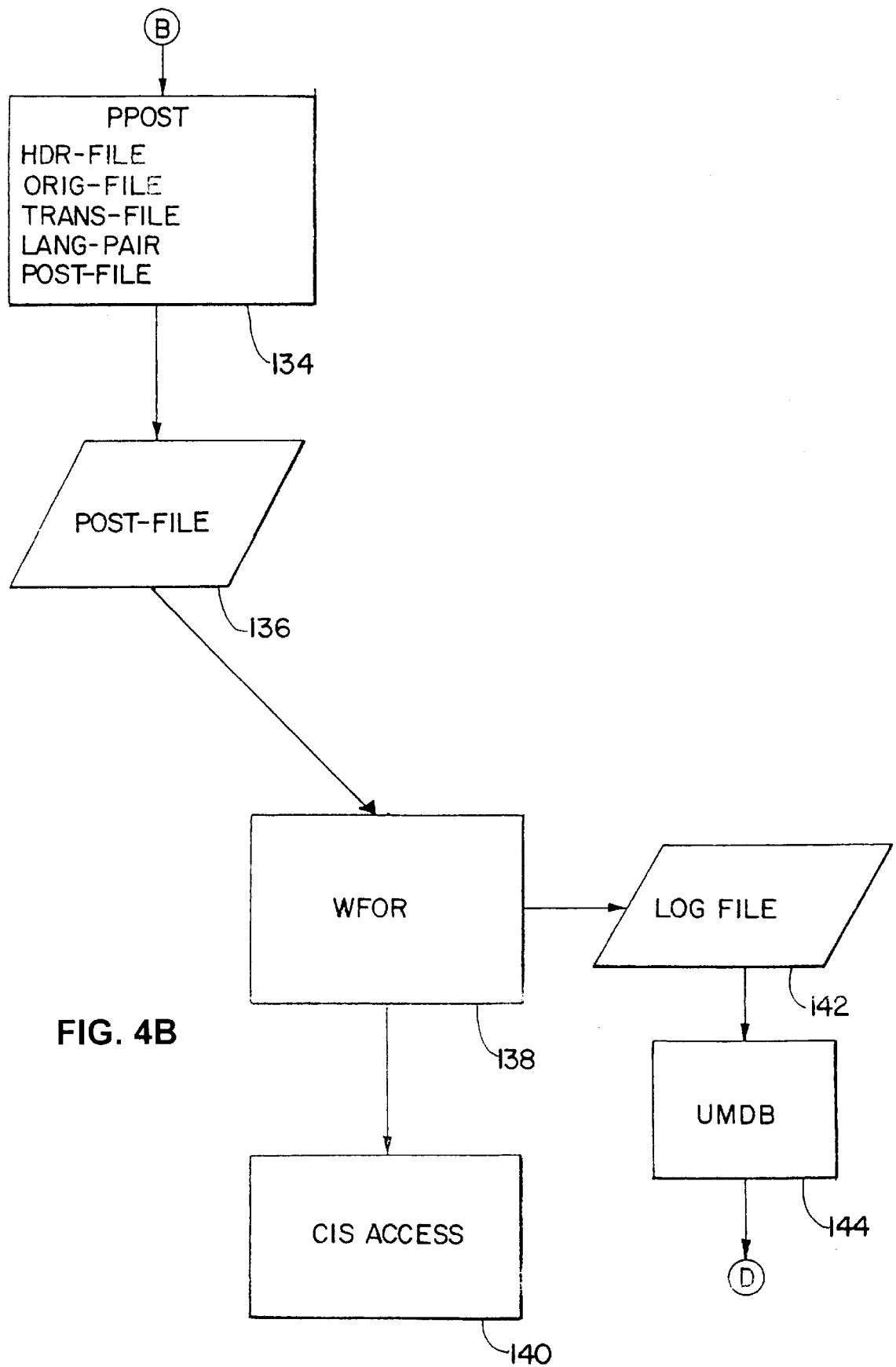

The shell script tricycle 90 governs sequencing of the MT process show in greater detail in FIGS. 4A–4B. Preferably, it frequently runs the MT programs in the appropriate order and for the correct number of times. The tricycle 90 script doses the following:

(1) Set some shell variables based on the current data and time; these are used to construct unique names for the temporary files that will be created;
(2) Enters a request in the at queue to cause tricycle to be run again at a particular time;
(3) Backs up a message number database;
(4) Calls the program r_for 92 for the English conference area; r_for 92 connects to CompuServe and reads new message headers to identify new messages to be translated;
(5) Calls the shell script rtrans 94 for the English conference area; rtrans 94 runs the messages through a filter program f_m 96 that identifies untranslatable message text, sends the message to DP/Translator 98 for translation, and routes the output from the translation to a post filtering program u_fm 100;
(6) Calls the program ppost 102 for the English conference area; ppost 102 creates the file to be posted to the conference areas; this program is run twice, once to create the English-to-German translation file and another to create the English-to-French translation file;
(7) Perform steps 3 through 5 for the French and German conference areas, although it only runs rtrans 94 once because translation only occurs for French to English and German to English;
(8) Calls the program w_for 164 six times, once for each language pair (e_f, eg, f_e, f_g, ge, g_f), to post all translated messages to their appropriate conference areas; and,
(9) Calls program umdb 106 six times, once for each language pair (e_f, eg, f_e, f_g, ge, g_f), to update message number database.

The program r_for 92 reads messages from the conference area, checks to make sure they are not machine translated, and prepares them for filtering. The shell script tricycle 90 calls r_for 92 and provides it with the necessary parameters. The program r_for 92 doses the following:

(1) Connects to CompuServe;
(2) Reads new message headers form the conference area;
(3) Compares the message numbers in the headers against those listed in a massage number database to determine whether the message is a machine-translated message from another conference area; if so, it skips the message and goes to the next one;
(4) Creates a message header file that contains the message number, sender, and other information; and
(5) Creates a message body text file that contains the message number and message text. The following parameters are specified:

| | |
|---|---|
| conference area-name | name of conference area from which message originated |
| lang-code | one-letter code (e, f or g) specifying the source language specified in the CompuServe subscriber profile |
| msg-dbase | name of the Unix database that holds a cross reference of all message numbers for each conference area |
| hdr-file | name of the header file created as output |
| msg-file | name of the message file created as output |

Inputs to r_for 92 are conference area-name, lang-code and msg-dbase provided by tricycle 90. Outputs from r_for 92 include hdr-file that is input to the MT Pre-Posting Process and msg-file that is the input to the MT Filter Process.

The shell script rtrans 94 calls the programs that filter, translate, and refilter the messages to be translated. The shell script tricycle 90 calls rtrans 94.

Referring to FIG. 4A, the program rtrans 120 does the following:

(1) Takes as input from tricycle the base name (referred to as base-name is some of the program descriptions that follow), the source language code, and the target language code;
(2) If the source language code is g for German, then calls the filter program f_m 122 with a special -g parameter that handles capitalization grammar rules specific to the German language;
(3) If the source language code is f_or e, calls filter program f_m 122 without special capitalization rules;
(4) Calls DP/Translator 126, providing it with the output file from f_m 122 and additional parameter; and, (5) Retrieves the output and passes it through the post filter program u.fm 130.

The program fm 122 runs the message file created during the MT Message Read Process through a filter process to prepare the message text for translation. The shell script rtrans 120 runs the prograram and provides it with the necessary parameters. Then, it submits the filtered output file as input to the translation program DP/Translator 126.

The program fm 122 does the following:
(1) Evaluates text for strings that should not be translated;
(2) Places marks around the identified strings; and,
(3) If the source language is German, performs special filtering to handle nouns that are always capitalized.

When it runs fm 122, rtrans 120 redirects input from the file base-name.source-lang. When it runs fm 122,rtrans 120 directs output to a target file name called base-name.i 124.

The program u.fm 130 runs the file generated from the language translation process DP/Translator 126 through a process that removes markers surrounding text strings that were not translated. The shell script rtrans 120 runs the program and provides it with the necessary parameters.

When it runs u.fm 130, rtrans 120 redirects input from the file base-name.o, which is an output file generated by DP/Translator 126 during the translator process. When it runs u.fm 130, rtrans 120 directs output to a target file base-name.target-lang, where target-lang is the one-character language code (e,f,g) of the language to which the message was translated.

The program ppost 134 creates a new file to post to the conference areas. The shell script tricycle calls the program six times, once for each source-target language translation pair (ef, eg, fe, fg, ge, gf). The header and message files may contain more than one message per run of ppost 134.

The program ppost 134 doses the following:
(1) Retrieves the header file created during the MT Message Read process;
(2) Retrieves the original message text written in the source language;
(3) Retrieves the translated message text;
(4) Determines the translation direction; and,
(5) Creates an output file 136 that contains the entire translation message. The following parameters are specified:

| | |
|---|---|
| hdr-file | header file created during the MT Message Read Process |
| orig-file | message in its original form, created during the MT Message Read Process |
| trans-file | translated message file |
| lang-pair | two-character code identifying the source-target language translation pair |
| post-file | file containing entire message to be posted onto the target conference area |

Inputs to ppost 134 include the header file from the MT Message Read Process (base-name.hdr), the original text file from the MT Message Read Process, and the source-target language pair. The posting files 136 that ppost 134 creates contain: the original message number and the translated text.

The program w.for 138 accesses CompuServe and posts translated message to their corresponding CompuServe conference areas. The shell script tricycle calls the program six times, once for each source-target language translation pair (ef,eg, fe, fg, ge, gf). The program w.for 138 does the following:
(1) Accesses the appropriate CompuServe conference area 140
(2) Posts the message files created during the MT Pre-Posting Process 142; and,
(3) Appends message and message number information to log file that is later used to update the message number database 144.

The following parameters are specified:

| | |
|---|---|
| conference area-name | name of destination conference area |
| post-file | name of the file created during the MT Pre-Posting Process |
| lang-pair | two-character code identifying the source-target language translation pair |
| msg-dbase | name of the Unix database that holds a cross reference of all message numbers for each conference area |
| log-file | file to which message numbers are appended and from which the cross reference of message numbers are updated |

Inputs to w.for 138 include conference area-name, post-file, lang-pair and msg-dbase provided by tricycle. The outputs of w.for 138 include the updated conference areas and six message database log files, one for each language pair.

The program umdb 144 updated the message number database with the message IDs assigned to each message on a conference area. The shell script tricycle calls umdb 144 six times, once for each source-target language translation pair (ef, eg, fe, fg, ge, gf).

Umdb 144 doses the following:
(1) Opens the message database; and
(2) Loads the message data into the database. The following parameters are specified:

| | |
|---|---|
| log-file | file to which message numbers are appended and from which the message number database is updated. |
| lang-pair | two-character code identifying the source-target language translation pair. |
| msg-dbase | name of the Unix database that holds a cross reference of all message numbers for each conference area. |

Inputs to umdb 144 include log-file, lang-pair, and msg-dbase provided by tricycle. The output of umdb 144 is the updated database.

END OF EXAMPLE

Figure 5:
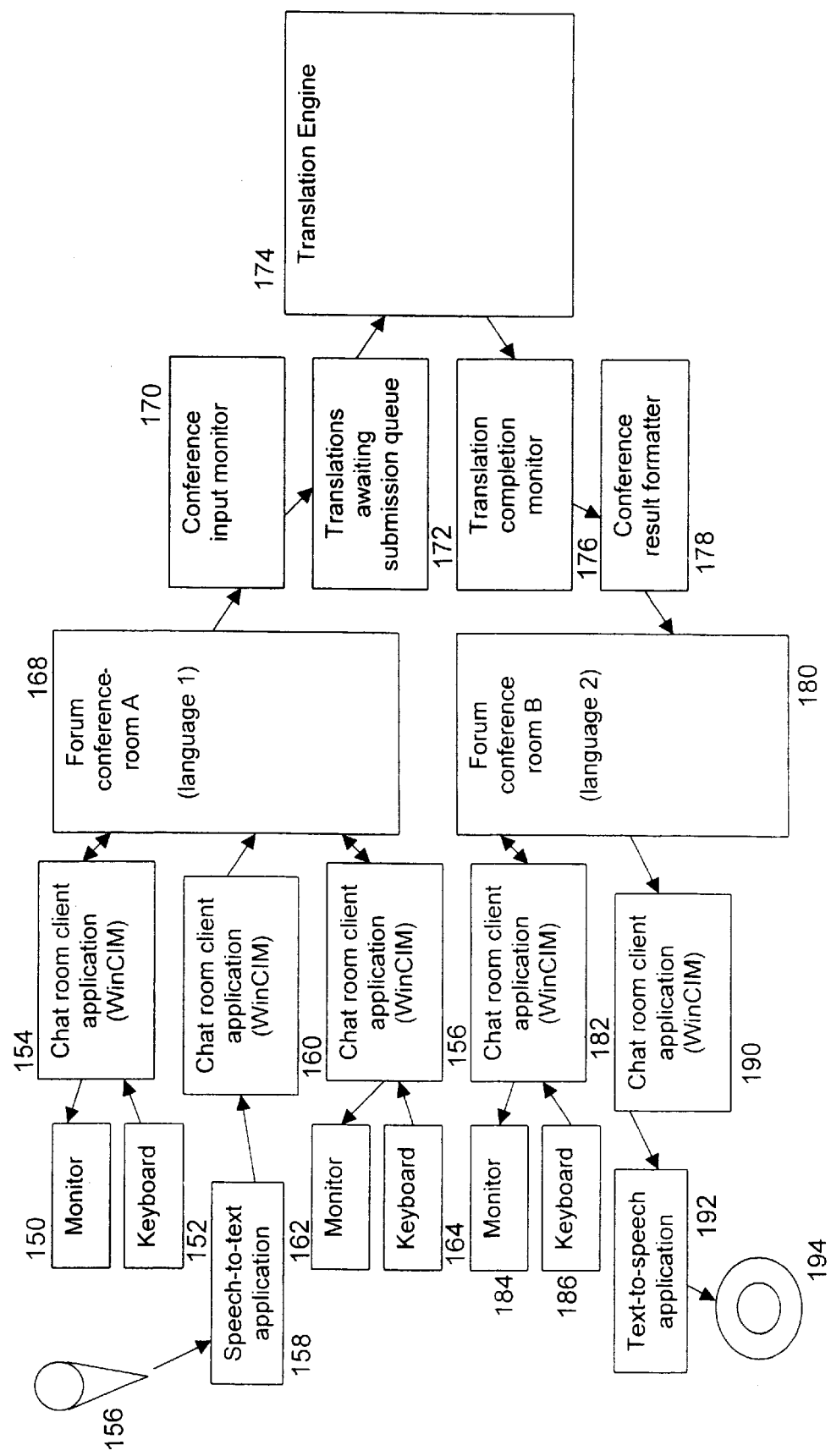
FIG. 5 is a system organization diagram of software processes for a preferred embodiment of the present invention.

Referring to FIG. 5, a system for a speech-to-speech chat session with five participants in which communications originating in a first language are translated to a second language is shown. In this example, two parallel conference areas 168, 170 are show. The number of parallel conference areas for a particular system varies with the number of languages it is designed to accommodate. For example, a parallel system designed to accommodate ten different languages may have ten parallel conference areas in which one supports a different language. Preferably, a participant selects a conference area based on the topic or subject matter of the discussion or conversation. Alternatively, upon initiating a request to join a conference area, a participant may choose his or her language preference and then join the French version of the conference.

Each participant has a personal computer equipped with Information Manager (IM) software 154, 160, 166, 182, 190 as decribed above for establishing a connection to a conference area 168, 180 at an online information service network in which a conversation regarding a particular topic is in progress. Participants may choose to interact with the system by typing and reading communications via their monitors and keyboards 150, 152, 162, 164, 184, 186. Alternatively, participants may speak their communications into microphones 156. Their communications then may be processed by speech-to-text software 158 which communicates with the IM 160. Participants may also hear the communications from other participants as output from IM 190 is directed to a text-to-speech application 192 which processes the textual data of communications through the speaker 194.

Based on a language preference as indicated via the IM 154, 160, 166, 182, 190, a participant is connected to a conference area in which conference communications relating to the selected topic or subject matter are presented in accordance with the participant's language preference 168, 180. For example, a participant who wishes to join a conversation about motorcycles and has a language preference of French may be connected to one conference room 168 while a participant who wishes to join the same conversation, but has a language preference of German may be connected to a different conference room 180. After connecting to a conference room 168, a French-speaking participant may elect to share a communication with the other participants and speak her communication into a microphone 156. The spoken communication is converted to text by the speech-to-text application. The IM treats the text as it would a communication that had been typed by the participant and assembles the textual data into PDUs and transmits them to the conference room 168 that the participant joined. A process for monitoring communications submitted to the conference room 170 arranges for translation of the communication from French to German and forwards the communication as assembled in PDUs to a translation queue 172. A translation engine 174 that monitors the translation queue 172 removes the PDUs or messages from the queue and translates them in accordance with the process described above. The translated communication is forwarded to a process that monitors the completion of translations 176. The translated communication is then forwarded to a process that formats the translated communication for posting to the German conference room 180. German speaking participants who have joined the German conference 180 then see or hear the translated message through the IM executing at their personal computers. A participant who participants in the conference room 180 session using a monitor 184 and keyboard 186 may view the results in a window displayed by the IM 182 while a participant who participates in the conference room 180 session using a microphone and speaker 94 may hear the results as recited by his computer. Using the present invention, German speaking participants may see or hear in their native language communications that originated from a French speaking participant. Likewise, they may respond in German to the French speaking participants communications and the French speaking participant may see or hear in her native language the communications that originated from the German speaking participants. The language translation process is transparent to the participants so they may not know that a communication has been translated from another language. The content and structure of the parallel conferences area are preferably identical so that a participant would see only a difference of languages when viewing the parallel conference areas.

Using the present invention, language barriers between participants of real-time conferences or chat sessions are eliminated. Participants who may not be able to converse with each other in a conventional manner are nevertheless able to converse electronically with one another because language barriers are removed via the automatic translation of communications, which may originate as speech, submitted by participants.

Figure 6A:
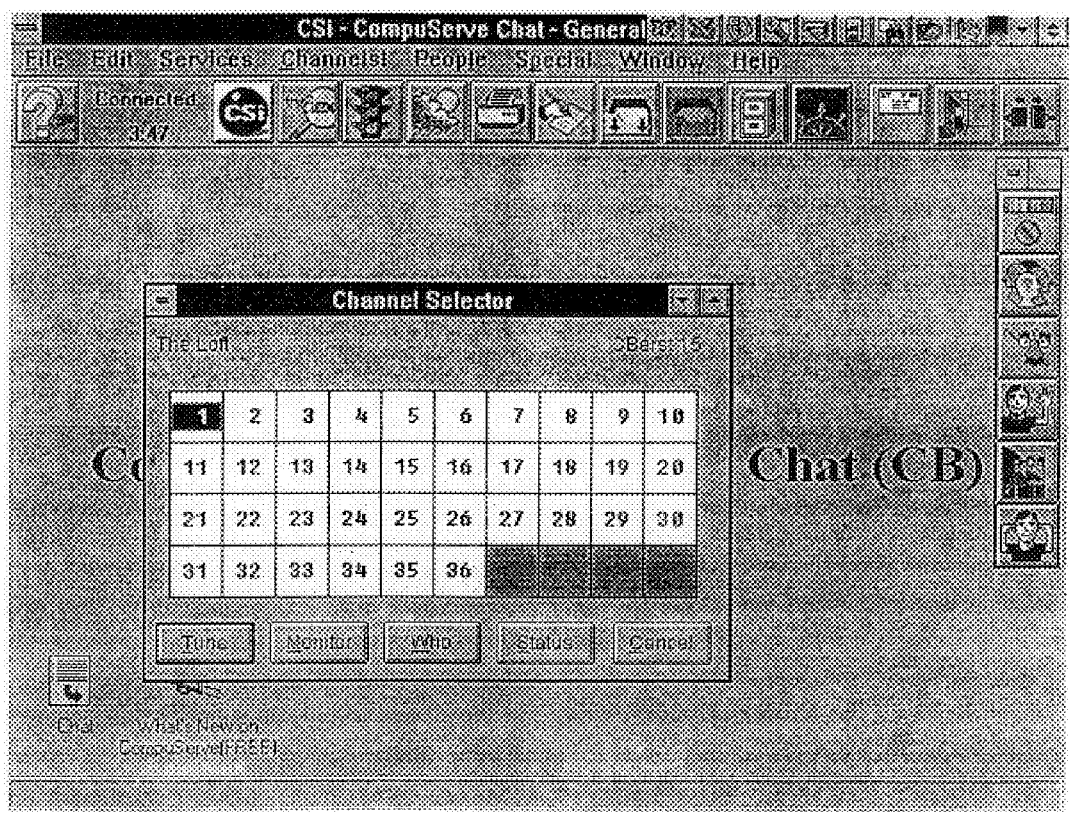
FIGS. 6A–E are screen displays of access software for a preferred embodiment of the present invention.
Figure 6B:
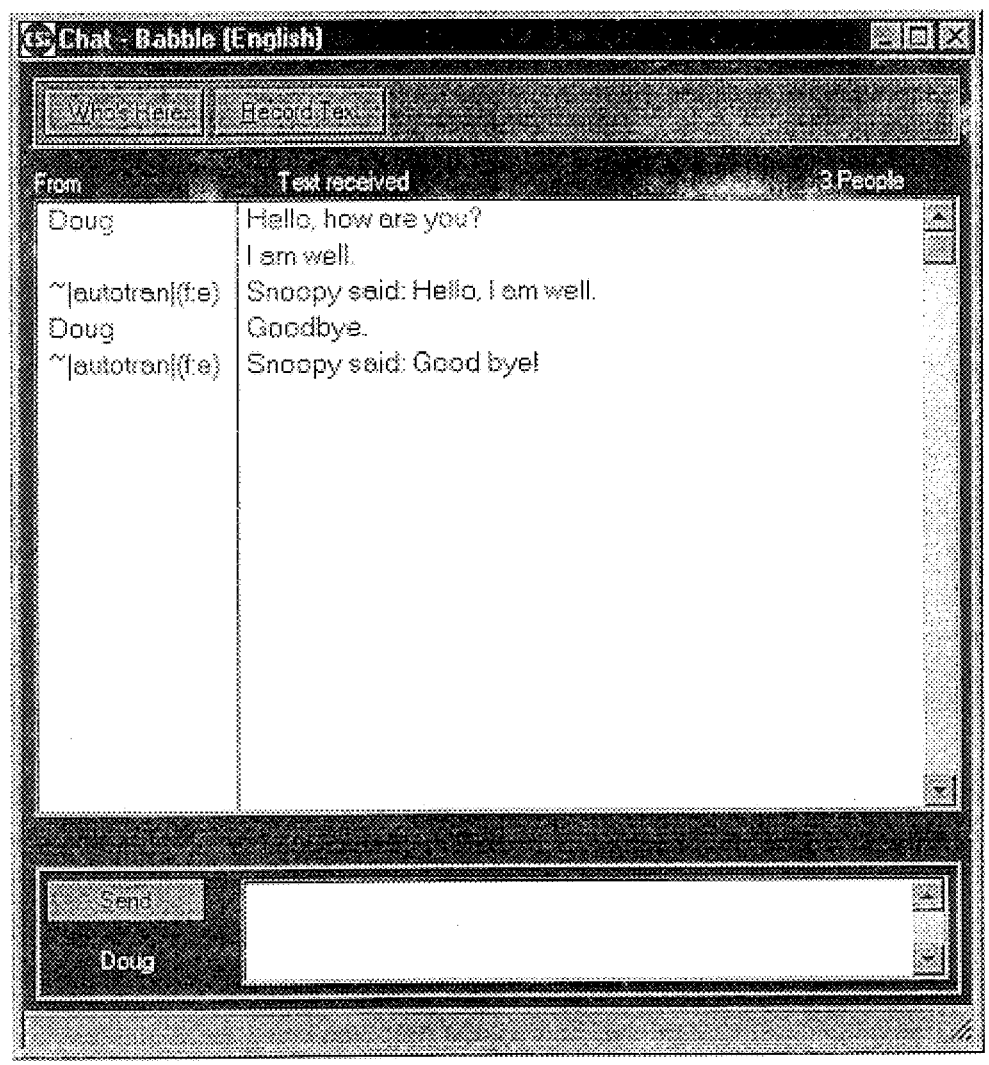
Figure 6C:
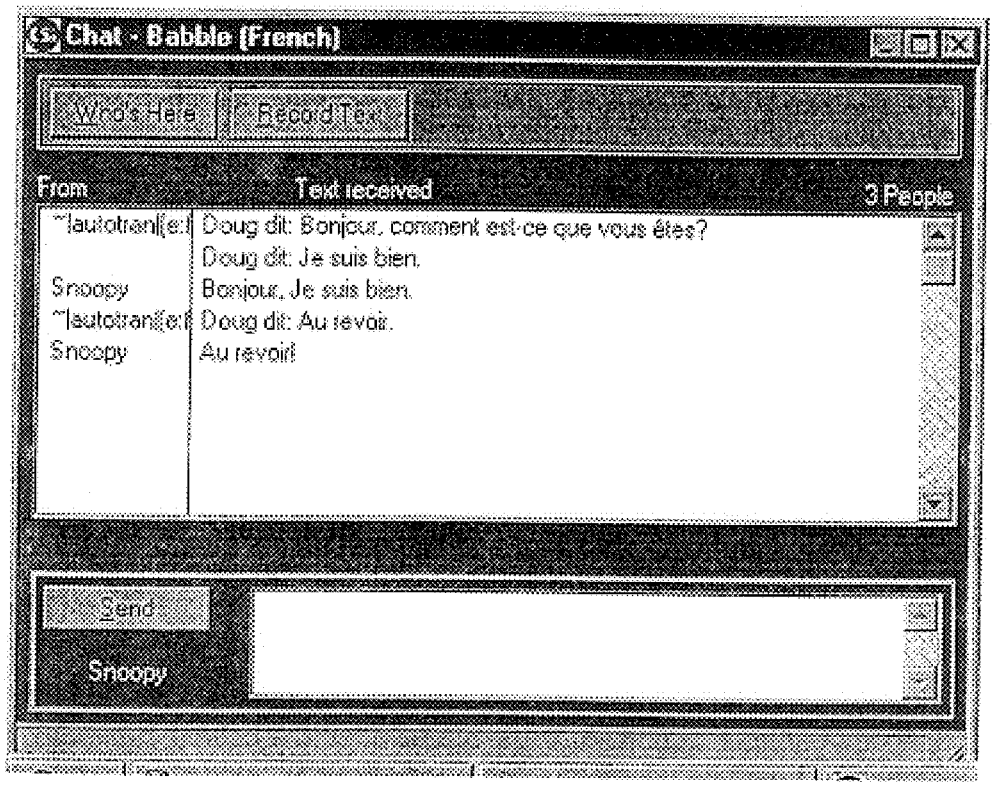
Figure 6D:
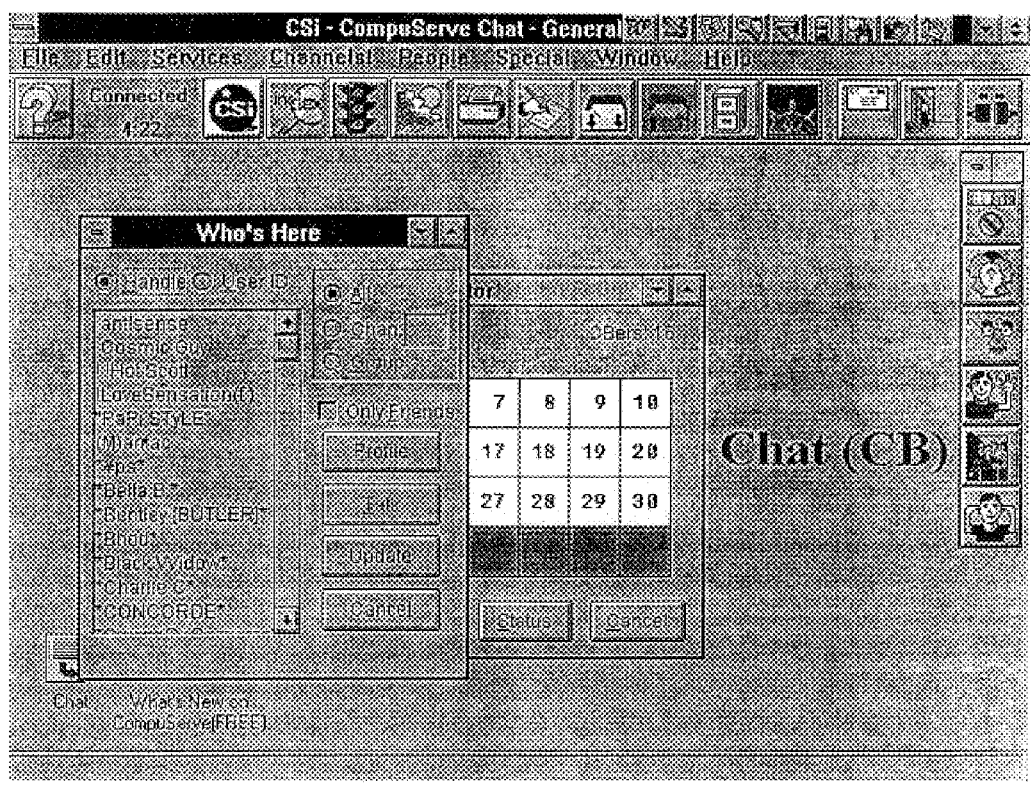
Figure 6E:
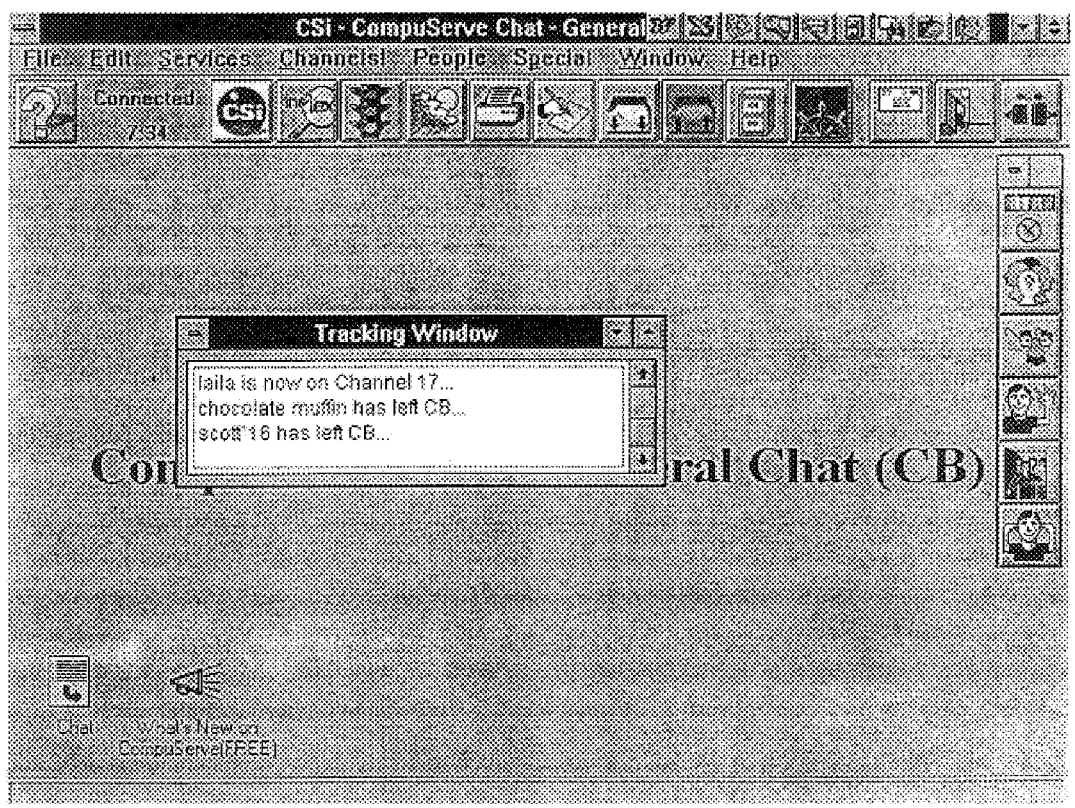

Referring to FIG. 6A–6B, a series of screen displays depicting the process of joining and participating in a conference is show. To join a real-time conference or chat, subscribers request access to a special area of the online information service. The area may be accessed by selecting it from a menu or selecting an icon associated with the area. Referring to FIG. 6A, after entering the area, subscribers are given the option of turning to one of a number of channels that support various ongoing conferences. Depending on a subscriber's area of interest, a subscriber tunes into a channel of interest by choosing it from a Channel Selector display as shown in FIG. 6A. After the subscriber tunes to a channel, a new window may appear to show information about the current session. As show in FIG. 6B and 6C, a window may be divided into two sections such that a first section as identified by "FROM" indicates which participant in a conference is sharing a communication while a second section as indicated by "Text received" displays the communication from the participant. As illustrated by FIG. 6B and 6C, interactions with a conference area similar for each participant exept that communications from participants appear in the language associated with the conference area. FIG. 6B shows a conversation occuring in English while FIG. 6B shows the same conversation occuring in French. Referring to FIG. 6B, for untranslated communications, the name of the participant from which the communication appears at in the "From" section of the window while the actual communication appears in the "Text received" section of the window. For a translated communication, the "From" section indicates that the communicattion was received from the translate process as show by the "~autotran|(f:e)" string appearing in the window. The *f:e* indicates the communication was translated from French to English. The "Text received" portion of the window indicates, in addition to the actual communication, the name of the participant who provided the communication—in this example, "Snoopy." Similar results are shown for the corresponding French conference area in FIG. 6C. Another window may be devoted to an input box so that participants may enter and send communications to one another regarding the topic or subject matter of the conference. Another window may be devoted to tracking activity on the channel (e.g., who has tuned in and who has left) or who is participating in the conference as shown respectively in FIG. 6D and 6E. Subscribers may leave the conference by joining a different conference, selecting a different service, or logging off the information service. Similar windows and displays may be presented to subscribers who participate in a parallel non-English conference (e.g., a French or German conference room.)

The ability to participate in real-time conference or chat with speech-to-speech and automated language translation features is unique to the present invention. Subscribers to an online information service in which the present invention is operational have the ability to speak their communications and hear communications from other participants that may been spoken originally in a different language. Alternatively, subscribers may participate by typing their communications and reading the communications of others. Access software establishes via a telephone line or other method a connection to the online information service. Once connected to the online information service, the access software on the subcriber's personal computer is ready to transmit and accept messages containing textual data in accordance with the subscriber's preferred language through the telephone line. Speech recognition and speech generation software may further process the textual data such that communications may be spoken and heard. Automated language translation capabilities at the online information service facilitate translation of communications so that subscribers with similar interests, but preferences for different languages, can share communications such as comments, questions, observations, etc. with each other. Furthermore, the speech-to-speech features of the present invention allow those who might not otherwise be able to participate in online conference or chat sessions to experience online conversations even with participants who so not speak their native language.

The present invention has been disclosed with reference to the disclosed embodiments. It will be apparent to one skilled in the art that variations and modifications may be made without departing from the invention in its broader aspects.

What is claimed is:

1. A method for conversing comprising the steps of:
    selecting a first language;
    connecting to an electronic conference area;
    receiving text communications in said first language from said electronic conference area, said text communications originating from spoken communications in a second language and said text communications translated from said second language to said first language in accordance with a machine translator adapted to batch process text communications; and
    translating said text communication in said first language to speech.

2. The method of claim 1 wherin said first language is selected from the group consisting of English, German, and French.

3. The method of claim 1 wherin said first second language is selected from the group consisting of English, German, and French.

4. A system for conversing in a plurality of languages comprising:
    a plurality of personal computers equipped with access software adapted to connect said personal computer to a host computer;
    speech recognition software at said plurality of personal computers for originating electronic communications;
    a conference manager at said host computer for managing electronic conference areas, said conference manager adapted to receive said electronic communications from said plurality of personal computers and post said electronic communications at electronic conference areas;
    a translation server for translating electronic communications from a first language to a second language in accordance with a batch process; and
    a plurality of electronic conference areas comprising untranslated and translated electronic communications, said electronic communications accessible to said plurality of personal computers in accordance with said conference manager.

5. The system of claim 4 further comprising speech generation software at said plurality of personal computers for speaking electronic communications received at said plurality of personal computers.

6. The system of claim 4 wherein said translation server is a subscriber to at least one of said plurality of electronic conference areas.

7. The system of claim 4 wherein said translation server is adapted to monitor an electronic conference area for untranslated electronic communications, forward said untranslated electronic communications to a translation engine, and receive translated electronic communications from said translation engine.

8. The system of claim 4 wherein said personal computers and said host computer communicate in accordance with an application level protocol.

9. A method for conversing in a plurality of languages, comprising the steps of:
    connecting to a first personal computer to a first conference area adapted for processing of messages in accordance with a first language;
    connecting a second personal computer to a second conference area adapted for processing of messages in accordance with a second language;
    converting a message from a user at said first personal computer from speech-to-text;
    transmitting said converted text message to said first conference area;
    translating said converted text message from said first language to said second language in accordance wit a machine translator adapted to batch process text messages;
    posting said translated text message to said second conference area; and
    transmitting said translated text message to said second personal computer.

10. The method of claim 9 wherein the step of translating said converted text message from said first language to said second language in accordance with a machine translator adapted to batch process text messages comprises the step of:
    monitoring for messages submitted to said first conference area;
    forwarding messages submitted to said first conference area to a translation queue;
    monitoring said translation queue;
    removing messages from said translation queue;
    translating said messages removed from said translation queue; and formatting the translated messages for posting to said second conference area.

11. The method of claim 10 wherein the step of monitoring said translation queue is performed by a translation engine.

12. The method of claim 9 wherein said first language is selected from the group consisting of English, German, and French.

13. The method of claim 9 wherein said second language is selected from the group consisting of English, German, and French.

14. The method of claim 9 further comprising the step of converting said translated text message at said second personal computer from text to speech.

15. The method of claim 9 further comprising the step or replying to said translated text message.

16. The method of claim 15 wherein the step of replying to said translated text message comprises the step of:

converting a message from a user at said second personal computer from speech to text;

transmitting said converted text message to said second conference area;

translating said converted text message form said second language to said first language in accordance with said machine translator adapted to batch process text messages;

posting said translated text message to said first conference area; and transmitting said translated text message to said first personal computer.

17. The method of claim 16 wherein the step of translating said converted text message from said second language to said first language in accordance with said machine translator adapted to batch process text messages comprises the steps of;

monitoring for messages submitted to said second conference area;

forwarding messages submitted to said second conference area to said translation queue;

monitoring said translation queue;

removing messages from said translation queue;

translating said messages removed from said translation queue; and formatting the translated messages for posting to said first conference area.

* * * * *

UNITED STATES PATENT AND TRADEMARK OFFICE
CERTIFICATE OF CORRECTION

PATENT NO. : 6,292,769 B1
DATED : September 18, 2001
INVENTOR(S) : Flanagan et al.

It is certified that error appears in the above-identified patent and that said Letters Patent is hereby corrected as shown below:

Column 15,
Line 43, please delete "first".
Line 49, please delete "computer" and replace it with -- computers --.

Column 16,
Line 31, please delete "wit" and replace it with -- with --.

Column 17,
Line 7, please delete "form" and replace it with -- from --.

Signed and Sealed this

Twenty-third Day of April, 2002

Attest:

JAMES E. ROGAN
Attesting Officer    Director of the United States Patent and Trademark Office